(12) United States Patent
Wang et al.

(10) Patent No.: US 11,477,738 B2
(45) Date of Patent: Oct. 18, 2022

(54) METHOD AND DEVICE FOR UPLINK POWER CONTROL

(71) Applicant: NTT DOCOMO, INC., Tokyo (JP)

(72) Inventors: Runxin Wang, Beijing (CN); Wenjia Liu, Beijing (CN); Xiaolin Hou, Beijing (CN); Kazuaki Takeda, Tokyo (JP); Daiki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/275,905

(22) PCT Filed: Sep. 28, 2018

(86) PCT No.: PCT/CN2018/108398
§ 371 (c)(1),
(2) Date: Mar. 12, 2021

(87) PCT Pub. No.: WO2020/062051
PCT Pub. Date: Apr. 2, 2020

(65) Prior Publication Data
US 2022/0060994 A1    Feb. 24, 2022

(51) Int. Cl.
*H04W 52/18*    (2009.01)
(52) U.S. Cl.
CPC .................. *H04W 52/18* (2013.01)
(58) Field of Classification Search
CPC ..................................................... H04W 52/18
USPC .................................................. 455/522, 69
See application file for complete search history.

(56) References Cited

U.S. PATENT DOCUMENTS

| | | | | |
|---|---|---|---|---|
| 9,456,421 B2* | 9/2016 | Pan | ............ | H04W 52/281 |
| 9,668,220 B2* | 5/2017 | Gao | ............ | H04W 52/325 |
| 10,057,916 B2* | 8/2018 | Barabell | ............ | H04W 72/046 |
| 10,425,900 B2* | 9/2019 | Liu | ............ | H04W 72/042 |
| 10,440,657 B2* | 10/2019 | Sundararajan | ...... | H04W 52/146 |
| 10,536,959 B2* | 1/2020 | Barabell | ............ | H04W 72/1263 |
| 10,674,455 B2* | 6/2020 | Dinan | ............ | H04L 5/0039 |
| 10,694,472 B2* | 6/2020 | Liu | ............ | H04W 52/241 |
| 10,757,656 B2* | 8/2020 | Wang | ............ | H04W 52/54 |
| 10,791,523 B2* | 9/2020 | Sundararajan | ...... | H04W 52/365 |
| 10,813,124 B2* | 10/2020 | Cao | ............ | H04L 1/1877 |
| 10,869,333 B2* | 12/2020 | Cao | ............ | H04L 1/1893 |
| 10,959,186 B2* | 3/2021 | Yasukawa | ............ | H04W 52/242 |
| 11,026,183 B2* | 6/2021 | Sundararajan | ...... | H04W 52/325 |
| 11,082,997 B2* | 8/2021 | Barabell | ............ | H04W 72/1263 |

(Continued)

FOREIGN PATENT DOCUMENTS

| | | | | |
|---|---|---|---|---|
| CN | 102413555 A | * | 4/2012 | ............ H04W 52/08 |
| CN | 102413555 A | | 4/2012 | |

(Continued)

OTHER PUBLICATIONS

International Search Report issued in PCT/CN2018/108398 dated Jun. 12, 2019 (2 pages).

*Primary Examiner* — Hai V Nguyen
(74) *Attorney, Agent, or Firm* — Osha Bergman Watanabe & Burton LLP

(57) ABSTRACT

Provided are a method and device for uplink power control. A user terminal performing the method includes: a receiving unit configured to receive signature information for the user terminal from a base station; and a control unit configured to determine a transmission power of the user terminal according to the received signature information.

11 Claims, 2 Drawing Sheets

(56) References Cited

U.S. PATENT DOCUMENTS

| | | | | |
|---|---|---|---|---|
| 11,096,126 B2* | 8/2021 | Dinan | | H04L 5/0051 |
| 2002/0187784 A1* | 12/2002 | Tigerstedt | | H04W 36/0088 |
| | | | | 455/439 |
| 2008/0045259 A1* | 2/2008 | Shen | | H04W 52/246 |
| | | | | 455/522 |
| 2008/0045260 A1* | 2/2008 | Muharemovic | | H04W 52/286 |
| | | | | 455/522 |
| 2008/0304551 A1* | 12/2008 | Li | | H04L 27/2626 |
| | | | | 375/140 |
| 2010/0137017 A1* | 6/2010 | Lin | | H04L 5/0007 |
| | | | | 455/522 |
| 2010/0277322 A1* | 11/2010 | Eckert | | G08B 13/2462 |
| | | | | 340/572.1 |
| 2010/0331037 A1* | 12/2010 | Jen | | H04W 52/545 |
| | | | | 455/522 |
| 2011/0250918 A1* | 10/2011 | Jen | | H04W 52/365 |
| | | | | 455/517 |
| 2014/0254455 A1* | 9/2014 | Nikopour | | H04L 1/0009 |
| | | | | 370/312 |
| 2015/0319707 A1* | 11/2015 | Abdelmonem | | H04L 5/006 |
| | | | | 455/522 |
| 2016/0037550 A1* | 2/2016 | Barabell | | H04W 72/1263 |
| | | | | 455/450 |
| 2016/0192297 A1* | 6/2016 | Kim | | H04B 7/0665 |
| | | | | 455/522 |
| 2017/0064531 A1* | 3/2017 | Stephenne | | H04W 40/20 |
| 2018/0176945 A1* | 6/2018 | Cao | | H04L 5/0055 |
| 2018/0242259 A1* | 8/2018 | Dinan | | H04L 5/14 |
| 2018/0332541 A1* | 11/2018 | Liu | | H04W 72/042 |
| 2018/0352561 A1* | 12/2018 | Barabell | | H04W 72/046 |
| 2019/0089498 A1* | 3/2019 | Pelletier | | H04L 5/003 |
| 2019/0090269 A1* | 3/2019 | Cao | | H04L 1/16 |
| 2019/0158345 A1* | 5/2019 | Lincoln | | H04W 24/10 |
| 2019/0363846 A1* | 11/2019 | Lei | | H04L 5/0091 |
| 2020/0006988 A1* | 1/2020 | Leabman | | H05B 3/34 |
| 2020/0092901 A1* | 3/2020 | Barabell | | H04W 72/046 |
| 2020/0107369 A1* | 4/2020 | Jeon | | H04W 72/14 |
| 2020/0145978 A1* | 5/2020 | Gulati | | H04L 1/0079 |
| 2020/0221506 A1* | 7/2020 | Jeon | | H04W 74/0833 |
| 2020/0351801 A1* | 11/2020 | Jeon | | H04W 52/48 |
| 2021/0045092 A1* | 2/2021 | Gotoh | | H04W 52/146 |
| 2021/0051736 A1* | 2/2021 | Jeon | | H04W 76/18 |
| 2021/0136811 A1* | 5/2021 | Cao | | H04L 1/16 |
| 2021/0144715 A1* | 5/2021 | Gotoh | | H04W 72/0493 |
| 2021/0144742 A1* | 5/2021 | Jeon | | H04W 52/50 |
| 2021/0227589 A1* | 7/2021 | Jiang | | H04L 5/0091 |
| 2021/0314975 A1* | 10/2021 | Barabell | | H04W 72/046 |
| 2021/0360705 A1* | 11/2021 | Oh | | H04W 76/30 |

FOREIGN PATENT DOCUMENTS

| | | | | |
|---|---|---|---|---|
| WO | WO-2019222415 A1 * | 11/2019 | | H04B 17/336 |
| WO | WO-2020102144 A1 * | 5/2020 | | H04W 52/146 |
| WO | WO-2020193847 A1 * | 10/2020 | | H04L 1/0003 |

* cited by examiner

METHOD AND DEVICE FOR UPLINK POWER CONTROL

TECHNICAL FIELD

The present disclosure relates to a field of mobile communication, and more specifically to a method and a device for uplink power control.

BACKGROUND

In order to improve anti-interference of a communication system, it has been proposed that a base station configures corresponding signature information for each user terminal in a Non-Orthogonal Multiple Access (NOMA) system, so that the user terminal may determines its own signature according to the signature information, thereby distinguishing different user terminals to reduce interference between user terminals. For example, the signature information may be information indicating an interleaving manner used by the user terminal when transmitting data, information indicating a scrambling manner used by the user terminal when transmitting data, information indicating a spreading manner used by the user terminal when transmitting data and the like. Accordingly, the user terminal may determine the interleaving manner, the scrambling manner, or the spreading manner according to the signature information, and use the determined interleaving manner, scrambling manner or spreading manner as its own signature.

In the current communication system design, the signature information configured by the base station for the user terminal is not directly related to power control of the user terminal. In addition, compared with an LTE/LTE-A system, the NOMA system has more application conditions, such as New Radio (NR) frame structure, NR modulation and channel coding and the like. Therefore, a range of power control parameters in the current communication system may no longer be suitable for the NOMA system.

SUMMARY OF THE DISCLOSURE

According to one aspect of the present disclosure, a method performed by a user terminal is provided. The method comprises: receiving signature information for the user terminal from a base station; and determining a transmission power of the user terminal according to the received signature information.

According to one example of the present disclosure, the signature information includes power information, and the power information indicates information about the transmission power of the user terminal.

According to one example of the present disclosure, the method further comprises: determining the transmission power of the user terminal according to a basic power of the user terminal, a path loss compensation power of the user terminal, a compensation power based on a modulation and coding scheme of the user terminal, and a compensation power for power control adjustment of uplink channels of the user terminal; the power information indicates adjustment information for at least one of the basic power, the path loss compensation power, the compensation power based on the modulation and coding scheme, and the compensation power for power control adjustment of uplink channels.

According to one example of the present disclosure, the basic power includes a nominal power set by the base station for all user terminals within a cell coverage of the base station, and a dedicated power for the user terminal; the power information indicates adjustment information for the dedicated power of the user terminal.

According to one example of the present disclosure, the path loss compensation power is determined according to a path loss compensation parameter of the user terminal and a downlink path loss of the user terminal; the power information indicates adjustment information for the path loss compensation parameter of the user terminal.

According to one example of the present disclosure, the method further comprises: determining the adjustment information for at least one of the basic power, the path loss compensation power, the compensation power based on the modulation and coding scheme, and the compensation power for power control adjustment of uplink channels according to high layer parameters.

According to another aspect of the present disclosure, a user terminal is provided. The user terminal comprises: a receiving unit configured to receive signature information for the user terminal from a base station; and a control unit configured to determine a transmission power of the user terminal according to the received signature information.

According to another aspect of the present disclosure, a method performed by a base station is performed. The method comprises: determining signature information for a user terminal; and transmitting the determined signature information to the user terminal.

According to one example of the present disclosure, the signature information includes power information, and the power information indicates information about the transmission power of the user terminal.

According to another aspect of the present disclosure, a base station is provided. The base station comprises: a control unit configured to determine signature information for a user terminal; and a transmitting unit configured to transmit the determined signature information to the user terminal.

According to one example of the present disclosure, the signature information includes power information, and the power information indicates information about a transmission power of the user terminal.

BRIEF DESCRIPTION OF THE DRAWINGS

The above and other objectives, features and advantages of the present disclosure will become clearer by describing embodiments of the present disclosure in details in conjunction with accompanying drawings. The accompanying drawings are used to provide a further understanding of the embodiments of the present disclosure, constitute a part of this specification, and explain the present disclosure together with the embodiments of the present disclosure, but do not constitute a limitation on the present disclosure. In the accompanying drawings, like reference numerals usually represent like components or steps.

DESCRIPTION OF THE EMBODIMENTS

Figure 1:
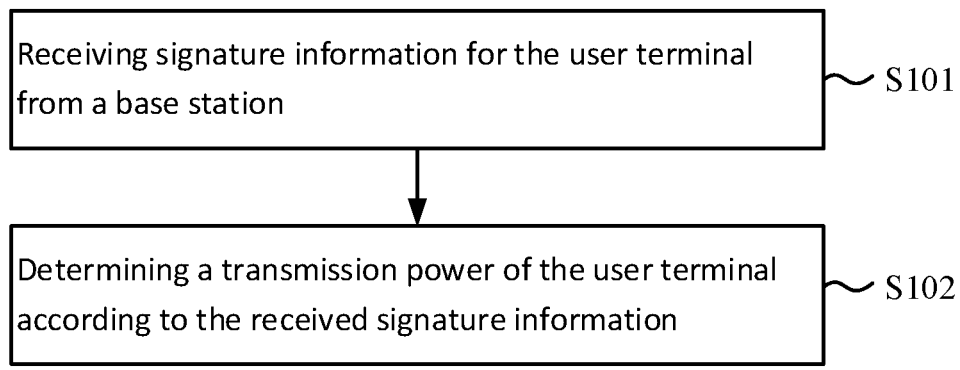
FIG. 1 is a flowchart of a method performed by a user terminal according to an embodiment of the present disclosure.

In order to make objectives, technical solutions and advantages of the present disclosure more apparent, exemplary embodiments according to the present disclosure will be described in detail below with reference to the accompanying drawings. Like reference numerals refer to like elements throughout the accompanying drawings. It should be understood that the embodiments described herein are merely illustrative and should not be construed as limiting the scope of the present disclosure. Furthermore, a user terminal described herein may include various types of user equipment (UE), for example, a mobile terminal (or referred to as a mobile station) or a fixed terminal. However, for convenience, the UE and the mobile station sometimes may be used interchangeably hereinafter. Furthermore, the base station may be a fixed station, a NodeB, an eNodeB (eNB), an access point, a transmitting point, a receiving point, a femto cell, a small cell and the like, which is not limited herein.

First, a method performed by a user terminal according to an embodiment of the present disclosure will be described with reference to FIG. 1. FIG. 1 is a flowchart of a method 100 for uplink power control performed by a user terminal according to an embodiment of the present disclosure.

According to one example of the present disclosure, the uplink power control may determine a transmission power of uplink physical channels. For example, the uplink power control may determine a transmission power of a Physical Uplink Shared Channel (PUSCH), a Physical Uplink Control Channel (PUCCH), a Physical Random Access Channel (PRACH) and the like. In addition, the uplink power control may also determine a transmission power for uplink signals. For example, the uplink power control may determine a transmission power for Sounding Reference Signals (SRSs). In the following examples, the uplink power control determining the transmission power of PUSCH is taken as an example to describe the embodiments of the present disclosure.

As shown in FIG. 1, in step S101, the user terminal receives signature information for the user terminal from a base station. For example, a signature may be a Multiple Access (MA) signature, such as the MA signature specified in 3GPP TR 38.812. For example, the signature of the user terminal may be one or more of the user terminal's transmission power, interleaving manner, scrambling manner, and spreading manner.

According to one example of the present disclosure, the signature information may be a signature parameter. The user terminal may determine the signature of the user terminal according to the signature parameter.

For example, the signature information may include power information, which indicates information about a transmission power of the user terminal, so that the user terminal may determine its own transmission power. In addition, the signature information may further include other information. For example, the signature information may further include interleaving information indicating the interleaving manner of the user terminal, so that the user terminal may determine its own interleaving manner. The signature information may further include scrambling information indicating the scrambling manner of the user terminal, so that the user terminal may determine its own scrambling manner. The signature information may further include spreading information indicating the spreading manner of the user terminal, so that the user terminal may determine its own spreading manner. Certainly, the signature information is not limited to include the power information, the interleaving information, the scrambling information, and the spreading information as listed herein, and may further include information indicating other operations performed on data when the user terminal transmits the data.

According to one example of the present disclosure, the signature information may be configured with a field having a predetermined bit length. In this example, a part of bits in the field of the signature information may represent the power information, and the other part of the bits may represent the interleaving information, the scrambling information, the spreading information and the like. For example, when the field of the signature information includes 4 bits, 2 bits of these 4 bits may represent the power information, and the other 2 bits of these 4 bits may represent the interleaving information.

Alternatively, in this example, all the bits of the field of the signature information may represent one or more of the power information, the interleaving information, the scrambling information, the spreading information and the like. When all the bits of the field of the signature information represent more than one of the power information, the interleaving information, the scrambling information, the spreading information and the like, the power information corresponding to the signature information has a corresponding relationship with the interleaving information, the scrambling information, the spreading information and the like corresponding to the signature information.

In addition, according to another example of the present disclosure, the user terminal may receive the signature information by receiving Radio Resource Control (RRC) signaling, Downlink Control Information (DCI), Media Access Control (MAC) Control Elements (CEs) and the like. For example, the user terminal may receive the signature information by using a plurality of DCI formats, such as DCI format 0_0 or DCI format 0_1 for PUSCH scheduling, DCI format 2_2 for PDSCH scheduling, and so on.

Then, in step S102, the user terminal determines the transmission power of the user terminal according to the received signature information. In the present disclosure, the user terminal may preliminarily determine the transmission power of the user terminal according to a basic power of the user terminal, a path loss compensation power of the user terminal, a compensation power based on a Modulation and Coding Scheme (MCS) of the user terminal, and a compensation power for power control adjustment of uplink channels of the user terminal. Furthermore, the user terminal may adjust at least one of the basic power, the path loss compensation power, the MCS-based compensation power, and the compensation power for power control adjustment of uplink channels according to the received signature information, to finally determine the transmission power of the user terminal and take the finally determined transmission power of the user terminal as the signature of the user terminal.

As described above, the signature information may include the power information, which indicates the information about the transmission power of the user terminal. For example, the power information may indicate adjustment information for at least one of the basic power of the user terminal, the path loss compensation power of the user terminal, the MCS-based compensation power of the user terminal, and the compensation power for power control adjustment of uplink channels of the user terminal.

In this example, the basic power may include a nominal power set by the base station for all user terminals within a cell coverage of the base station and a dedicated power of the user terminal. In this case, the power information may indicate adjustment information for the dedicated power of the user terminal, such as indicating an adjustment value for the dedicated power of the user terminal.

In addition, in this example, the path loss compensation power may be determined according to a path loss compensation parameter of the user terminal and a downlink path loss of the user terminal. In this case, the power information may indicate adjustment information for the path loss compensation parameter of the user terminal, such as indicating an adjustment value for the path loss compensation parameter of the user terminal.

In addition, in this example, the MCS-based compensation power may be determined according to the MCS of the user terminal. In this case, the power information may indicate adjustment information for the MCS-based compensation power of the user terminal, such as indicating an adjustment value for the MCS-based compensation power.

In addition, in this example, the compensation power for power control adjustment of uplink channels may be determined according to a Transmission Power Control (TPC) command. In this case, the power information may indicate adjustment information for the compensation power for power control adjustment of uplink channels, such as indicating an adjustment value for the compensation power for power control adjustment of uplink channels.

According to another example of the present disclosure, in addition to the basic power of the user terminal, the path loss compensation power of the user terminal, the MCS-based compensation power of the user terminal, and the compensation power for power control adjustment of uplink channels of the user terminal, the transmission power of the user terminal may also be related to a bandwidth of physical resources occupied by the user terminal. For example, the compensation power of the transmission power may be configured according to the number of resource blocks (RBs) occupied by the user terminal.

According to another example of the present disclosure, a corresponding relationship between the signature information and at least one of the adjustment information for the basic power, the adjustment information for the path loss compensation power, the adjustment information for the MCS-based compensation power, and the adjustment information for the compensation power for power control adjustment of uplink channels may be configured, so as to adjust the basic power, the path loss compensation power, the MCS-based compensation power, or the compensation power for power control adjustment of uplink channels. For example, a table may be configured. The table may include multiple values of the field of the signature information, and at least one of an adjustment value for the basic power, an adjustment value for the path loss compensation power, an adjustment value for the MCS-based compensation power and an adjustment value for the compensation power for power control adjustment of uplink channels corresponding to each value.

It should be appreciated that in this example, one table or a plurality of tables for different situations may be configured. When a plurality of tables for different situations are configured, the adjustment value for the basic power, the adjustment value for the path loss compensation power, the adjustment value for the MCS-based compensation power or the adjustment value for the compensation power for power control adjustment of uplink channels corresponding to a same value of the field of the signature information in the plurality of tables may be different. For example, when three tables are configured, the adjustment value for the basic power corresponding to a first value of the field of the signature information in a first table may be $\delta_1$, the adjustment value for the basic power corresponding to the first value of the field of the signature information in a second table may be $\delta_2$, and the adjustment value for the basic power corresponding to the first value of the field of the signature information in a third table may be $\delta_3$, where $\delta_1 \neq \delta_2 \neq \delta_3$.

In addition, according to another example of the present disclosure, the adjustment information for the at least one of the basic power, the path loss compensation power, the compensation power based on the modulation and coding scheme, and the compensation power for power control adjustment of uplink channels may further be determined according to high layer parameter(s). For example, the adjustment value for the basic power may be determined according to the high layer parameters. For example, for a specific table, the table may include a corresponding relationship between the signature information and the adjustment information for the basic power; then, the adjustment value for the basic power may be further calculated according to the high layer parameters.

In addition, for example, in the case that a plurality of tables for different situations are configured, it is also possible to determine which one of the plurality of tables is to be used through high layer parameter(s), so as to determine the adjustment information for the at least one of the basic power, the path loss compensation power, the compensation power based on the modulation and coding scheme, and the compensation power for power control adjustment of uplink channels according to the determined table.

According to another example of the present disclosure, the method for configuring the above one or more tables may be performed by a communication device, such as a base station, a user terminal, and the like. For example, the communication device may store the determined first table after performing the method for configuring the tables. However, the present disclosure is not limited thereto. According to another example of the present disclosure, the method for configuring the tables may also be performed by a core network device. For example, the core network device may notify the base station or the user terminal of the configured table, and then the base station or the user terminal stores the first table. In addition, according to another example of the present disclosure, the method for configuring the tables may not be performed by the communication device or the core network device, but by the manufacturer before the communication device or the core network device leaves the factory. For example, the tables may be tables that have been stored inside the communication device when the communication device leaves the factory.

An example of determining the transmission power of the user terminal according to the signature information will be described below with reference to Equations (1-1)-(4-2).

For example, the user terminal may determine the adjustment value for the basic power according to the signature information, and then determine the transmission power of the user terminal according to the basic power, the adjustment value for the basic power, the path loss compensation power, the MCS-based compensation power, and the compensation power for power control adjustment of uplink channels. For example, PUSCH transmission power of the user terminal on UL BWP (BandWidth Part) of a carrier of a serving cell may be determined by the following Equation (1-1):

$$P_{PUSCH,b,f,c}(i, j, q_d, l, m) =$$ Equation (1-1)
$$\min \begin{cases} P_{CMAX,f,c}(i), \\ P_{O\_PUSCH,b,f,c}(j) + P_{O\_NOMA\_PUSCH,b,f,c}(j, m) + \\ 10\log_{10}(2^{\mu} \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$

where b represents UL BWP, f represents the carrier, c represents the serving cell, i represents a transmission occasion of PUSCH, j represents an index configured by parameter setting, $q_d$ represents a reference signal index used by the user terminal when calculating downlink path loss, l represents an index of a PUSCH power control adjustment state, and m represents the signature information of the user terminal.

In Equation (1-1), $P_{CMAX,f,c}(i)$ represents the UE maximum transmission power for the carrier f of the serving cell cat PUSCH transmission occasion i. For example, $P_{CMAX,f,c}(i)$ may be the UE maximum output power specified in 3GPP TS38.101-1 and TS38101-2.

According to one example of the present disclosure, the user terminal may configure its own maximum output power. For the carrier f of the serving cell c, the configured UE maximum output power $P_{CMAX,f,c}$ may be defined as that available to the reference point of a given transmitter branch that corresponds to the reference point in each receiver branch. For example, the configured UE maximum output power $P_{CMAX,f,c}$ may be defined as that available to the reference point of a given transmitter branch that corresponds to the reference point of the high layer filtered Reference Signal Receiving Power (RSRP) measurement in each receiver branch.

In addition, in Equation (1-1), $P_{O\_PUSCH,b,f,c}(j)$ represents the basic power of the user terminal. For example, $P_{O\_PUSCH,b,f,c}(j)$ may be composed of component $P_{O\_NOMINAL\_PUSCH,f,c}(j)$ and component $P_{O\_UE\_PUSCH,b,f,c}(j)$, where the component $P_{O\_NOMINAL\_PUSCH,f,c}(j)$ represents the nominal power set by the base station for all user terminals within the cell coverage of the base station, the component $P_{O\_UE\_PUSCH,b,f,c}(j)$ represents the dedicated power of the user terminal, j∈{0, 1, . . . , J−1} and is a natural number.

According to one example of the present disclosure, the user terminal may determine a first nominal power of the user terminal depending on whether a first high layer parameter is provided. For example, the first higher layer parameter may be PO-PUSCH-AlphaSet.

Specifically, when the user terminal is not provided with the high layer parameter PO-PUSCH-AlphaSet (or used for Msg3 PUSCH transmission), j=0 and the dedicated power of the user terminal may be 0, that is, $P_{O\_UE\_PUSCH,f,c}(0)=0$ and, $P_{O\_NOMINAL\_PUSCH,f,c}(0)=P_{O\_PRE}+\Delta_{PREAMBLE\_Msg3}$, where the parameter $P_{O\_PRE}$ and the parameter $\Delta_{PREAMBLE\_Msg3}$ may be the parameter preambleReceivedTargetPower (for example, specified in TS38.321) and the parameter msg3-DeltaPreamble provided by high layers of the carrier f of the serving cell c, respectively.

When the user terminal is provided with the high layer parameter PO-PUSCH-AlphaSet, the dedicated power of the user terminal may not be 0, that is, $P_{O\_UE\_PUSCH,f,c}(0) \neq 0$. In this case, for grant-free uplink and granted uplink, the nominal power set by the base station for all user terminals within the cell coverage of the base station and the dedicated power of the user terminal may be determined in different ways. For example, in a grant-free uplink system, for PUSCH transmission (or retransmission) configured by the high layer parameter ConfiguredGrantConfig, j=1, $P_{O\_NOMINAL\_PUSCH,f,c}(1)$ may be provided by the high layer parameter p0-NominalWithoutGrant, and $P_{O\_UE\_PUSCH,b,f,c}(1)$ may be provided by the high layer parameter p0 obtained from PO-PUSCH-Alpha in ConfiguredGrantConfig that provides the index PO-PUSCH-AlphaSetId to a set of high layer parameters PO-PUSCH-AlphaSet used for UL BWP b of the carrier f of the serving cell c. For example, in a granted uplink system, for j∈{2, . . . , J−1}=$S_J$, a value of $P_{O\_NOMINAL\_PUSCH,f,c}(j)$ applicable to all j∈$S_J$ may be provided by the high layer parameter p0-NominalWithGrant used for each carrier f of the serving cell c, and a set of values of $P_{O\_UE\_PUSCH,b,f,c}(j)$ may be provided by a set of high layer parameters p0 in PO-PUSCH-AlphaSet indicated by various sets of high layer parameters p0-PUSCH-AlphaSetId used for UL BWP b of the carrier f of the serving cell c.

In addition, in Equation (1-1), $P_{O\_NOMA\_PUSCH,b,f,c}(j, m)$ represents the adjustment value for the basic power. In the present disclosure, $P_{O\_NOMA\_PUSCH,b,f,c}(j, m)$ may be determined according to the signature information m received in step S101. For example, $P_{O\_NOMA\_PUSCH,b,f,c}(j, m)$ may represent the adjustment value for the dedicated power of the user terminal. In this case, $P_{O\_NOMA\_PUSCH,b,f,c}(j, m)$ may be rewritten as $P_{O\_UENOMA\_PUSCH,b,f,c}(j, m)$.

According to one example of the present disclosure, a corresponding relationship between the signature information and the adjustment value for the dedicated power of the user terminal may be configured. Accordingly, the user terminal may determine $P_{O\_NOMA\_PUSCH,b,f,c}(j, m)$ according to the corresponding relationship between m and $P_{O\_NOMA\_PUSCH,b,f,c}(j, m)$. For example, when m=0, $P_{O\_NOMA\_PUSCH,b,f,c}(j, m)=P_1$; when m=1, $P_{O\_NOMA\_PUSCH,b,f,c}(j, m)=P_2$; when m=2, $P_{O\_NOMA\_PUSCH,b,f,c}(j, m)=P_3$, and so on.

According to one example of the present disclosure, the user terminal may determine a value of the adjustment value for the first nominal power according to the first high layer parameter. For example, the value of the adjustment value for the first nominal power may be provided by the high layer parameter p0 obtained from PO-PUSCH-Alpha in ConfiguredGrantConfig that provides the index PO-PUSCH-AlphaSetId to a set of high layer parameters PO-PUSCH-AlphaSet used for UL BWP b of the carrier f of the serving cell c. For another example, the adjustment value for the first nominal power may be provided by a set of high layer parameters p0 in PO-PUSCH-AlphaSet indicated by various sets of high layer parameters p0-PUSCH-AlphaSetId used for UL BWP b of the carrier f of the serving cell c.

In addition, in Equation (1-1), 10 $\log_{10}$ ($2^{\mu} \cdot M_{RB,b,f,c}^{PUSCH}(i)$) represents the compensation power determined according to the number of RBs occupied by the user terminal. $M_{RB,b,f,c}^{PUSCH}(i)$ represents a bandwidth of PUSCH resource allocation, which is expressed as the number of resource blocks for PUSCH transmission occasion i on UL BWP b of the carrier f of the serving cell c. In addition, μ represents a subcarrier interval configuration.

In addition, in Equation (1-1), $\alpha_{b,f,c}(j) \cdot PL_{b,f,c}(q_d)$ represents the path loss compensation power. $PL_{b,f,c}(q_d)$ may be a downlink path loss estimate in dB calculated by the user terminal by using the reference signal index $q_d$ for DL BWP. For example, the user terminal may determine $PL_{b,f,c}(q_d)$ by using a difference between the reference signal power and the high layer filtering RSRP.

According to one example of the present disclosure, when the value of j is different, the user terminal may determine a value of $\alpha_{b,f,c}(j)$ by different high layer parameters. For example, the user terminal may determine the value of $\alpha_{b,f,c}(j)$ by the first high layer parameter. For example, when j=1, $\alpha_{b,f,c}(1)$ may be provided by the high layer parameter alpha obtained from PO-PUSCH-Alpha in ConfiguredGrantConfig that provides the index PO-PUSCH-AlphaSetId to a set of high layer parameters PO-PUSCH-AlphaSet used for UL BWP b of the carrier f of the serving cell c. For another example, a set of values of $\alpha_{b,f,c}(j)$ applicable to all $j \in S_J$ may be provided by a set of high layer parameters alpha in PO-PUSCH-AlphaSet indicated by various sets of high layer parameters p0-PUSCH-AlphaSetId used for UL BWP b of the carrier f of the serving cell c.

For another example, the user terminal may determine a value of $\alpha_{b,f,c}(j)$ by using a second high layer parameter. The second high layer parameter may be the high layer parameter msg3-Alpha. For example, when j=0, $\alpha_{b,f,c}(0)$ may be a value of the high layer parameter msg3-Alpha.

In addition, in Equation (1-1), $\Delta_{TF,b,f,c}(i)$ represents the MCS-based compensation power at PUSCH transmission occasion i. According to one example of the present disclosure, the user terminal may determine a value of $\Delta_{TF,b,f,c}(i)$ by using a third high layer parameter. For example, the third high layer parameter may be the high layer parameter deltaMCS for each UL BWP b of each carrier f of the serving cell c.

In addition, in Equation (1-1), $f_{b,f,c}(i, l)$ represents the compensation power for power control adjustment of uplink channels at PUSCH transmission occasion i. The compensation power for power control adjustment of uplink channels at PUSCH transmission occasion i may include a compensation power for power control adjustment of uplink channels at a transmission occasion prior to PUSCH transmission occasion i (for example, the last transmission occasion $i_{last}$ of PUSCH transmission occasion i) and a correction value. For example, $f_{b,f,c}(i, l)$ may be determined by the following Equation (1-2):

$$f_{b,f,c}(i,l) = f_{b,f,c}(i_{last},l) + \delta_{PUSCH,b,f,c}(i_{last},K_{PUSCH},l) \quad \text{Equation (1-2)}$$

where $f_{b,f,c}(i, l)$ represents the compensation power for power control adjustment of uplink channels at the last transmission occasion $i_{last}$ of PUSCH transmission occasion i, $\delta_{PUSCH,b,f,c}(i_{last}, i, K_{PUSCH}, l)$ represents a correction value, and $K_{PUSCH}$ represents the number of symbols used for UL BWP b of the carrier f of the serving cell c after the last symbol of the corresponding PDCCH and before the first symbol transmitted by PUSCH.

In addition, in Equation (1-1), the basic power and the adjustment value for the basic power are expressed as two separate components, but the present disclosure is not limited thereto. According to another example of the present disclosure, the adjustment value for the basic power may be considered as a component of the basic power. In this case, Equation (1-1) may be rewritten as the following Equation (1-3):

$$P_{PUSCH,b,f,c}(i, j, q_d, l, m) = \quad \text{Equation (1-3)}$$

$$\min \begin{cases} P_{CMAX,f,c}(i), \\ P_{o\_PUSCH,b,f,c}(j, m) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$

where $P_{O\_PUSCH,b,f,c}(j, m)$ may be composed of the component $P_{O\_NOMINAL\_PUSCH,f,c}(j)$, the component $P_{O\_UE\_PUSCH,b,f,c}(j)$ and the component $P_{O\_UENOMA\_PUSCH,b,f,c}(j, m)$.

The foregoing describes the example of determining the transmission power of the user terminal according to the basic power, the adjustment value for the basic power, the path loss compensation power, the MCS-based compensation power, and the compensation power for power control adjustment of uplink channels. According to another example of the present disclosure, the user terminal may also determine the transmission power of the user terminal according to the basic power, the path loss compensation power, the adjustment value for the path loss compensation power, the MCS-based compensation power, and the compensation power for power control adjustment of uplink channels. For example, PUSCH transmission power of the user terminal on UL BWP of a carrier of a serving cell may be determined by the following Equation (2-1):

$$P_{PUSCH,b,f,c}(i, j, q_d, l, m) = \quad \text{Equation (2-1)}$$

$$\min \begin{cases} P_{CMAX,f,c}(i), \\ P_{o\_PUSCH,b,f,c}(j) + 10\log_{10}(2^\mu \cdot \\ M_{RB,b,f,c}^{PUSCH}(i)) + \alpha_{b,f,c}(j) \cdot \\ PL_{b,f,c}(q_d) + \alpha_{b,f,c}(m) \cdot PL_{b,f,c}(q_d) + \\ \Delta_{TF,b,f,c}(i) + f_{b,f,c}(i, l) \end{cases}$$

Since details of Equation (2-1) are partially the same as the details of Equation (1-1) described above, a detailed description of the same content is omitted herein for simplicity.

In Equation (2-1), $\alpha_{b,f,c}(m) \cdot PL_{b,f,c}(q_d)$ represents the adjustment value for the path loss compensation power. In the present disclosure, $\alpha_{b,f,c}(m)$ may be determined according to the signature information m received in step S101. $\alpha_{b,f,c}(m)$ may be the adjustment value for the path loss compensation parameter. According to one example of the present disclosure, a corresponding relationship between the signature information and the adjustment value for the path loss compensation parameter may be configured. Accordingly, the user terminal may determine $\alpha_{b,f,c}(m)$ according to the corresponding relationship between m and $\alpha_{b,f,c}(m)$. For example, when m=0, $\alpha_{b,f,c}(m) = \alpha_1$; when m=1, $\alpha_{b,f,c}(m) = \alpha_2$; when m=2, $\alpha_{b,f,c}(M) = \alpha_3$, and so on.

According to one example of the present disclosure, the user terminal may determine the value of the adjustment value for the path loss compensation parameter by using the first high layer parameter. For example, the value of $\alpha_{b,f,c}(m)$ may be provided by a set of high layer parameters alpha in PO-PUSCH-AlphaSet indicated by various sets of high layer parameters p0-PUSCH-AlphaSetId used for UL BWP b of the carrier f of the serving cell c.

In addition, in Equation (2-1), the path loss compensation power and the adjustment value for the path loss compensation power are expressed as two separate components, but the present disclosure is not limited thereto. According to another example of the present disclosure, the adjustment value for the path loss compensation power may be considered as a component of the path loss compensation power. In this case, Equation (2-1) may be rewritten as the following Equation (2-2):

$$P_{PUSCH,b,f,c}(i, j, q_d, l, m) = \min \begin{cases} P_{CMAX,f,c}(i), \\ P_{o\_PUSCH,b,f,c}(j) + 10\log_{10}(2^\mu \cdot M_{RB,b,f,c}^{PUSCH}(i)) + \\ \alpha_{b,f,c}(j, m) \cdot PL_{b,f,c}(q_d) + \Delta_{TF,b,f,c}(i) + f_{b,f,c}(i, l) \end{cases} \quad \text{Equation (2-2)}$$

where $\alpha_{b,f,c}(j, m)$ represents the adjusted path loss compensation parameter.

According to one example of the present disclosure, a corresponding relationship between the signature information and the adjusted path loss compensation parameter may be configured. Accordingly, the user terminal may determine $\alpha_{b,f,c}(j,m)$ according to the corresponding relationship between m and $\alpha_{b,f,c}(j, m)$. For example, in a system that symbol level spreading is configured, when m=0, $\alpha_{b,f,c}(j,m)=1$.

In addition, according to another example of the present disclosure, the user terminal may also determine the transmission power of the user terminal according to the basic power, the path loss compensation power, the MCS-based compensation power, the adjustment value for the MCS-based compensation power, and the compensation power for power control adjustment of uplink channels. For example, PUSCH transmission power of the user terminal on UL BWP of a carrier of a serving cell may be determined by the following Equation (3-1):

$$P_{PUSCH,b,f,c}(i, j, q_d, l, m) = \min \begin{cases} P_{CMAX,f,c}(i), \\ P_{o\_PUSCH,b,f,c}(j) + 10\log_{10}(2^\mu \cdot M_{RB,b,f,c}^{PUSCH}(i)) + \alpha_{b,f,c}(j) \cdot \\ PL_{b,f,c}(q_d) + \Delta_{TF,b,f,c}(i, m) + \\ \Delta_{NOMA,b,f,c}(i, m) + f_{b,f,c}(i, l) \end{cases} \quad \text{Equation (3-1)}$$

Since details of Equation (3-1) are partially the same as the details of Equation (1-1) described above, a detailed description of the same content is omitted herein for simplicity.

In Equation (3-1), $\Delta_{NOMA,b,f,c}(i, m)$ represents the adjustment value for the MCS-based compensation power. In the present disclosure, $\Delta_{NOMA,b,f,c}(i, m)$ may be determined according to the signature information m received in step S101. According to one example of the present disclosure, a corresponding relationship between the signature information and the adjustment value for the MCS-based compensation power may be configured. Accordingly, the user terminal may determine $\Delta_{NOMA,b,f,c}(i, m)$ according to the corresponding relationship between m and $\Delta_{NOMA,b,f,c}(i,m)$. For example, when m=0, $\Delta_{NOMA,b,f,c}(i, m)=\Delta_1$; when m=1, $\Delta_{NOMA,b,f,c}(i, m)=\Delta_2$; when m=2, $\Delta_{NOMA,b,f,c}(i, m)=\Delta_3$, and so on.

In addition, in Equation (3-1), the MCS-based compensation power and the adjustment value for the MCS-based compensation power are expressed as two separate components, but the present disclosure is not limited thereto. According to another example of the present disclosure, the adjustment value for the MCS-based compensation power may be considered as a component of the MCS-based compensation power. In this case, Equation (3-1) may be rewritten as the following Equation (3-2):

$$P_{PUSCH,b,f,c}(i, j, q_d, l, m) = \min \begin{cases} P_{CMAX,f,c}(i), \\ P_{o\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i, m) + f_{b,f,c}(i, l) \end{cases} \quad \text{Equation (3-2)}$$

where $\Delta_{TF,b,f,c}(l, m)$ may be composed of the component $\Delta_{TF,b,f,c}(i)$ and the component $\Delta_{NOMA,b,f,c}(i, m)$.

According to one example of the present disclosure, $\Delta_{TF,b,f,c}(i, m)$ may also be composed of only the component $\Delta_{NOMA,b,f,c}(i, m)$. For example, in a system that symbol level spreading is configured, $\Delta_{TF,b,f,c}(i, m)$ may be equal to $\Delta_{NOMA,b,f,c}(i, m)$.

According to another example of the present disclosure, a corresponding relationship between the signature information m and $\Delta_{TF,b,f,c}(i, m)$ may be configured. Accordingly, the user terminal may determine the value of $\Delta_{TF,b,f,c}(i, m)$ according to the corresponding relationship between m and $\Delta_{TF,b,f,c}(i, m)$. For example, when m=0, $\Delta_{TF,b,f,c}(i, m)=0$; when m=1, $\Delta_{TF,b,f,c}(i, m)=3$; when m=2, $\Delta_{TF,b,f,c}(i, m)=-3$, and so on.

In addition, according to another example of the present disclosure, the user terminal may also determine the transmission power of the user terminal according to the basic power, the path loss compensation power, the MCS-based compensation power, the compensation power for power control adjustment of uplink channels, and the adjustment value for the compensation power for power control adjustment of uplink channels. For example, PUSCH transmission power of the user terminal on UL BWP of a carrier of a serving cell may be determined by the following Equation (4-1):

$$P_{PUSCH,b,f,c}(i, j, q_d, l, m) = \min \begin{cases} P_{CMAX,f,c}(i), \\ P_{o\_PUSCH,b,f,c}(j) + \\ 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + \\ f_{b,f,c}(i, l) + f_{NOMA,b,f,c}(i, l, m) \end{cases} \quad \text{Equation (4-1)}$$

Since details of Equation (4-1) are partially the same as the details of Equation (1-1) described above, a detailed description of the same content is omitted herein for simplicity.

In Equation (4-1), $f_{NOMA,b,f,c}(i, l, m)$ represents the adjustment value for the compensation power for power control adjustment of uplink channels. In the present disclosure, $f_{NOMA,b,f,c}(i, l, m)$ may be determined according to the signature information m received in step S101. According to one example of the present disclosure, a corresponding relationship between the signature information and the adjustment value for the compensation power for power control adjustment of uplink channels may be configured. Accordingly, the user terminal may determine $f_{NOMA,b,f,c}(i, l, m)$ according to the corresponding relationship between m and $f_{NOMA,b,f,c}(i, l, m)$. For example, when m=0, $f_{NOMA,b,f,c}(i, 1, m)=f_1$; when m=1, $f_{NOMA,b,f,c}(i, 1, m)=f_2$; when m=3, $f_{NOMA,b,f,c}(i, 1, m)=f_3$, and so on.

In addition, in Equation (4-1), the compensation power for power control adjustment of uplink channels and the adjustment value for the compensation power for power control adjustment of uplink channels are expressed as two separate components, but the present disclosure is not limited thereto. According to another example of the present disclosure, the adjustment value for the compensation power for power control adjustment of uplink channels may be considered as a component of the compensation power for power control adjustment of uplink channels. In this case, Equation (4-1) may be rewritten as the following Equation (4-2):

$$P_{PUSCH,b,f,c}(i, j, q_d, l, m) = \quad \text{Equation (4-2)}$$
$$\min \begin{cases} P_{CMAX,f,c}(i), \\ P_{o\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l, m) \end{cases}$$

where $f_{b,f,c}(i, l, m)$ represents the adjusted compensation power for power control adjustment of uplink channels. When the compensation power for power control adjustment of uplink channels is adjusted, the correction value may be adjusted accordingly.

According to one example of the present disclosure, the correction value may be referred to as a TPC command, which may be included in DCI format 0_0 or DCI format 0_1 for scheduling PUSCH transmission occasion ion UL BWP b of the carrier f of the serving cell c. In addition, the correction value may also be coded jointly with other TPC commands in DCI format 2_2.

For example, a corresponding relationship between the value of the TPC command field and the correction value may be configured, as shown in Table 1. For example, in Table 1, the first column represents the value of the TPC command field, the second column represents the accumulated $\delta_{PUSCH,b,f,c}$, and the third column represents the absolute $\delta_{PUSCH,b,f,c}$.

TABLE 1

| TPC command field | Accumulated $\delta_{PUSCH, b, f, c}$ [dB] | Absolute $\delta_{PUSCH, b, f, c}$ [dB] |
| --- | --- | --- |
| 0 | −1 | −4 |
| 1 | 0 | −1 |
| 2 | 1 | 1 |
| 3 | 3 | 4 |
| 4 | −3 | −3 |
| 5 | −2 | −2 |
| 6 | 2 | 2 |
| 7 | 0.5 | 3 |

It should be noted that, although the equations for determining the transmission power of the user terminal (for example, Equations (1-1)-(4-2) as described above) only involve an adjustment value for one of the basic power, the path loss compensation power, the compensation power based on the coding and modulation scheme, and the compensation power for power control adjustment of uplink channels, those skilled in the art would appreciate that the equations for determining the transmission power of the user terminal may involve adjustment values for two or more of the basic power, the path loss compensation power, the compensation power based on the coding and modulation scheme, and the compensation power for power control adjustment of uplink channels.

In addition, according to one example of the present disclosure, the user terminal may set a plurality of power update times to update the transmission power of PUSCH. For example, the user terminal may update the transmission power of PUSCH at a start time and a middle time of PUSCH transmission.

In addition, according to another example of the present disclosure, the signature information m as described above may be any one of the index j configured by the parameter setting, the reference signal index qd used by the user terminal when calculating the downlink path loss, and the index/of the PUSCH power control adjustment state. For example, the value of the signature information m may be the same as the value of the index j configured by the parameter setting, the reference signal index qd used by the user terminal when calculating the downlink path loss, or the index/of the PUSCH power control adjustment state.

In addition, according to one example of the present disclosure, user terminals with the same transmission power in the communication system may be divided into a group of user terminals. A plurality of user terminals in the same group of user terminals may have signatures that are at least partially the same. For example, a plurality of user terminals in the same group of user terminals may have the same transmission power, and at the same time may have different spreading manners, interleaving manners, scrambling manners and the like.

With the method performed by the user terminal in this embodiment, the signature information of the user terminal has a direct relationship with power control of the user terminal. Therefore, when power control is performed on a plurality of user terminals, the communication system may consider signature information of the plurality of user terminals, to reduce interference between the plurality of user terminals, so as to enable a better performance of the communication system. In addition, with the method performed by the user terminal in this embodiment, a range of existing power control parameters is extended, so that they can be adapted to the NOMA system.

Figure 2:
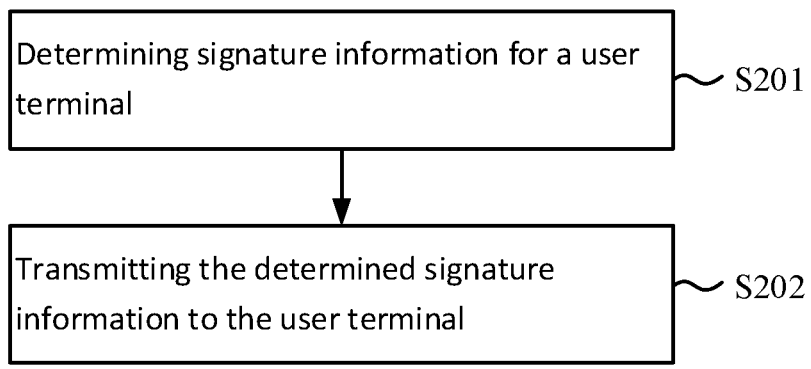
FIG. 2 is a flowchart of a method performed by a base station according to an embodiment of the present disclosure.

A method performed by a base station corresponding to the method 100 will be described below with reference to FIG. 2. FIG. 2 is a flowchart of a method 200 performed by a base station for uplink power control according to an embodiment of the present disclosure. Since details of the method 200 are partially the same as the details of the method 100 described above with reference to FIG. 1, a detailed description of the same content is omitted herein for simplicity. As shown in FIG. 2, in step S201, the base station determines signature information for a user terminal. For example, a signature may be a Multiple Access (MA) signature, such as the MA signature specified in 3GPP TR 38.812. For example, the signature of the user terminal may be one or more of the user terminal's transmission power, interleaving manner, scrambling manner, and spreading manner.

According to one example of the present disclosure, the signature information may be a signature parameter. The user terminal may determine the signature of the user terminal according to the signature parameter.

For example, the signature information may include power information, which indicates information about a transmission power of the user terminal, so that the user terminal may determine its own transmission power. In addition, the signature information may further include other information. For example, the signature information may further include interleaving information indicating the interleaving manner of the user terminal, so that the user terminal may determine its own interleaving manner. The signature information may further include scrambling information indicating the scrambling manner of the user terminal, so that the user terminal may determine its own scrambling manner. The signature information may further include spreading information indicating the spreading manner of the user terminal, so that the user terminal may determine its own spreading manner. Certainly, the signature information is not limited to include the power information, the interleaving information, the scrambling information, and the spreading information as listed herein, and may further include information indicating other operations performed on data when the user terminal transmits the data.

Then, in step S202, the base station transmits the determined signature information to the user terminal. According to another example of the present disclosure, the base station may transmit the signature information by Radio Resource Control (RRC) signaling, Downlink Control Information (DCI), Media Access Control (MAC) Control Elements (CEs) and the like. For example, the base station may transmit the signature information by using a plurality of DCI formats, such as DCI format 0_0 or DCI format 0_1 for PUSCH scheduling, DCI format 2_2 for PDSCH scheduling, and so on.

With the method performed by the base station in this embodiment, the signature information of the user terminal has a direct relationship with power control of the user terminal. Therefore, when power control is performed on a plurality of user terminals, the communication system may consider signature information of the plurality of user terminals, to reduce interference between the plurality of user terminals, so as to enable a better performance of the communication system. In addition, with the method performed by the base station in this embodiment, a range of existing power control parameters is extended, so that they can be adapted to the NOMA system.

Figure 3:
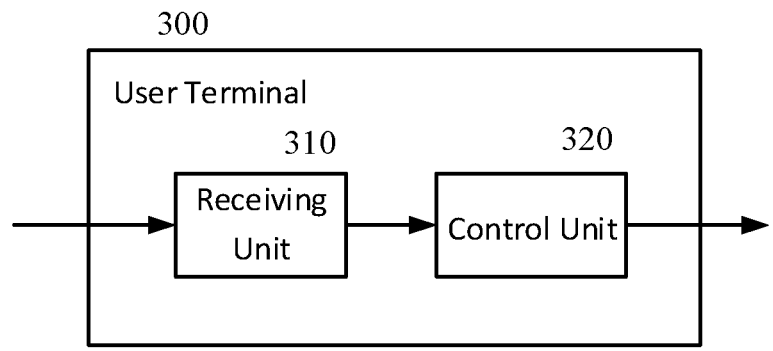
FIG. 3 is a schematic structural diagram of a user terminal according to an embodiment of the present disclosure.

A user terminal according to an embodiment of the present disclosure will be described below with reference to FIG. 3. FIG. 3 is a schematic structural diagram of a user terminal 300 according to an embodiment of the present disclosure. Since functions of the user terminal 300 are partially the same as the details of the method 100 described above with reference to FIG. 1, a detailed description of the same content is omitted herein for simplicity. As shown in FIG. 3, the user terminal 300 includes: a receiving unit 310 configured to receive signature information for the user terminal from a base station, where the signature information includes power information, and the power information indicates information about transmission power of the user terminal; and a control unit 320 configured to determine the transmission power of the user terminal according to the received signature information. In addition to these two units, the user terminal 300 may further include other components. However, since these components are irrelevant with the content of the embodiments of the present disclosure, their illustrations and descriptions are omitted herein.

According to one example of the present disclosure, the signature information may be a signature parameter. The user terminal may determine the signature of the user terminal according to the signature parameter.

For example, the signature information may include power information, which indicates information about a transmission power of the user terminal, so that the user terminal may determine its own transmission power. In addition, the signature information may further include other information. For example, the signature information may further include interleaving information indicating the interleaving manner of the user terminal, so that the user terminal may determine its own interleaving manner. The signature information may further include scrambling information indicating the scrambling manner of the user terminal, so that the user terminal may determine its own scrambling manner. The signature information may further include spreading information indicating the spreading manner of the user terminal, so that the user terminal may determine its own spreading manner. Certainly, the signature information is not limited to include the power information, the interleaving information, the scrambling information, and the spreading information as listed herein, and may further include information indicating other operations performed on data when the user terminal transmits the data.

According to one example of the present disclosure, the signature information may be configured with a field having a predetermined bit length. In this example, a part of bits in the field of the signature information may represent the power information, and the other part of the bits may represent the interleaving information, the scrambling information, the spreading information and the like. For example, when the field of the signature information includes 4 bits, 2 bits of these 4 bits may represent the power information, and the other 2 bits of these 4 bits may represent the interleaving information.

Alternatively, in this example, all the bits of the field of the signature information may represent one or more of the power information, the interleaving information, the scrambling information, the spreading information and the like. When all the bits of the field of the signature information represent more than one of the power information, the interleaving information, the scrambling information, the spreading information and the like, the power information corresponding to the signature information has a corresponding relationship with the interleaving information, the scrambling information, the spreading information and the like corresponding to the signature information.

In addition, according to another example of the present disclosure, the receiving unit 310 may receive the signature information by receiving Radio Resource Control (RRC) signaling, Downlink Control Information (DCI), Media Access Control (MAC) Control Elements (CEs) and the like. For example, the user terminal may receive the signature information by using a plurality of DCI formats, such as DCI format 0_0 or DCI format 0_1 for PUSCH scheduling, DCI format 2_2 for PDSCH scheduling, and so on.

In the present disclosure, the control unit 320 may preliminarily determine the transmission power of the user terminal according to a basic power of the user terminal, a path loss compensation power of the user terminal, a compensation power based on a Modulation and Coding Scheme (MCS) of the user terminal, and a compensation power for power control adjustment of uplink channels of the user terminal. Furthermore, the control unit 320 may adjust at least one of the basic power, the path loss compensation power, the MCS-based compensation power, and the compensation power for power control adjustment of uplink channels according to the received signature information, to finally determine the transmission power of the user terminal and take the finally determined transmission power of the user terminal as the signature of the user terminal.

As described above, the signature information may include the power information, which indicates the information about the transmission power of the user terminal.

For example, the power information may indicate adjustment information for at least one of the basic power of the user terminal, the path loss compensation power of the user terminal, the MCS-based compensation power of the user terminal, and the compensation power for power control adjustment of uplink channels of the user terminal.

In this example, the basic power may include a nominal power set by the base station for all user terminals within a cell coverage of the base station and a dedicated power of the user terminal. In this case, the power information may indicate adjustment information for the dedicated power of the user terminal, such as indicating an adjustment value for the dedicated power of the user terminal.

In addition, in this example, the path loss compensation power may be determined according to a path loss compensation parameter of the user terminal and a downlink path loss of the user terminal. In this case, the power information may indicate adjustment information for the path loss compensation parameter of the user terminal, such as indicating an adjustment value for the path loss compensation parameter of the user terminal.

In addition, in this example, the MCS-based compensation power may be determined according to the MCS of the user terminal. In this case, the power information may indicate adjustment information for the MCS-based compensation power of the user terminal, such as indicating an adjustment value for the MCS-based compensation power.

In addition, in this example, the compensation power for power control adjustment of uplink channels may be determined according to a Transmission Power Control (TPC) command. In this case, the power information may indicate adjustment information for the compensation power for power control adjustment of uplink channels, such as indicating an adjustment value for the compensation power for power control adjustment of uplink channels.

According to another example of the present disclosure, in addition to the basic power of the user terminal, the path loss compensation power of the user terminal, the MCS-based compensation power of the user terminal, and the compensation power for power control adjustment of uplink channels of the user terminal, the transmission power of the user terminal may also be related to a bandwidth of physical resources occupied by the user terminal. For example, the compensation power of the transmission power may be configured according to the number of resource blocks (RBs) occupied by the user terminal.

According to another example of the present disclosure, a corresponding relationship between the signature information and at least one of the adjustment information for the basic power, the adjustment information for the path loss compensation power, the adjustment information for the MCS-based compensation power, and the adjustment information for the compensation power for power control adjustment of uplink channels may be configured, so as to adjust the basic power, the path loss compensation power, the MCS-based compensation power, or the compensation power for power control adjustment of uplink channels. For example, a table may be configured. The table may include multiple values of the field of the signature information, and at least one of an adjustment value for the basic power, an adjustment value for the path loss compensation power, an adjustment value for the MCS-based compensation power and an adjustment value for the compensation power for power control adjustment of uplink channels corresponding to each value.

An example of determining the transmission power of the user terminal according to the signature information will be described below with reference to the above Equations (1-1)-(4-2).

For example, the user terminal may determine the adjustment value for the basic power according to the signature information, and then determine the transmission power of the user terminal according to the basic power, the adjustment value for the basic power, the path loss compensation power, the MCS-based compensation power, and the compensation power for power control adjustment of uplink channels. For example, PUSCH transmission power of the user terminal on UL BWP (BandWidth Part) of a carrier of a serving cell may be determined by the above Equation (1-1).

In Equation (1-1), $P_{CMAX,f,c}(i)$ represents the UE maximum transmission power for the carrier f of the serving cell c in PUSCH transmission occasion i. For example, $P_{CMAX,f,c}(i)$ may be the UE maximum output power specified in 3GPP TS38.101-1 and TS38101-2.

According to one example of the present disclosure, the control unit 320 may configure its own maximum output power. For the carrier f of the serving cell c, the configured UE maximum output power $P_{CMAX,f,c}$ may be defined as that available to the reference point of a given transmitter branch that corresponds to the reference point in each receiver branch. For example, the configured UE maximum output power $P_{CMAX,f,c}$ may be defined as that available to the reference point of a given transmitter branch that corresponds to the reference point of the high layer filtered Reference Signal Receiving Power (RSRP) measurement in each receiver branch.

In addition, in Equation (1-1), $P_{O\_PUSCH,b,f,c}(j)$ represents the basic power of the user terminal. For example, $P_{O\_PUSCH,b,f,c}(j)$ may be composed of component $P_{O\_NOMINAL\_PUSCH,b,f,c}(j)$, and component $P_{O\_UE\_PUSCH,b,f,c}(j)$, where the component $P_{O\_NOMINAL\_PUSCH,b,f,c}(j)$ represents the nominal power set by the base station for all user terminals within the cell coverage of the base station, the component $P_{O\_UE\_PUSCH,b,f,c}(j)$ represents the dedicated power of the user terminal, $j \in \{0, 1, \ldots j-1\}$ and is a natural number.

According to one example of the present disclosure, the user terminal may determine a first nominal power of the user terminal depending on whether a first high layer parameter is provided. For example, when the user terminal is not provided with the high layer parameter PO-PUSCH-AlphaSet (or used for Msg3 PUSCH transmission), j=0 and the dedicated power of the user terminal may be 0, that is, $P_{O\_UE\_PUSCH,b,f,c}(0)=0$, and then $P_{O\_PUSCH,b,f,c}(j)$ is equal to the component $P_{O\_NOMINAL\_PUSCH,f,c}(j)$. When the user terminal is provided with the high layer parameter PO-PUSCH-AlphaSet, the dedicated power of the user terminal may not be 0, that is, $P_{O\_UE\_PUSCH,f,c}(0) \neq 0$, and then $P_{O\_PUSCH,b,f,c}(j)$ is equal to the sum of the component $P_{O\_NOMINAL\_PUSCH,f,c}(j)$ and the component $P_{O\_UE\_PUSCH,b,f,c}(j)$.

In addition, in Equation (1-1), $P_{O\_NOMA\_PUSCH,b,f,c}(j, m)$ represents the adjustment value for the basic power. In the present disclosure, $P_{O\_NOMA\_PUSCH,b,f,c}(j, m)$ may be determined according to the signature information m received in step S101. For example, $P_{O\_NOMA\_PUSCH,b,f,c}(j, m)$ may represent the adjustment value for the dedicated power of the user terminal. In this case, $P_{O\_NOMA\_PUSCH,b,f,c}(j, m)$ may be rewritten as $P_{O\_UENOMA\_PUSCH,b,f,c}(j, m)$.

According to one example of the present disclosure, a corresponding relationship between the signature information and the adjustment value for the dedicated power of the user terminal may be configured. Accordingly, the user terminal may determine $P_{O\_NOMA\_PUSCH,b,f,c}(j, m)$ according to the corresponding relationship between m and $P_{O\_NOMA\_PUSCH,b,f,c}(j, m)$. For example, when m=0, $P_{O\_NOMA\_PUSCH,b,f,c}(j, m)=P_1$; when m=1, $P_{O\_NOMA\_PUSCH,b,f,c}(j, m)=P_2$; when m=2, $P_{O\_NOMA\_PUSCH,b,f,c}(j, m)=P_3$, and so on.

In addition, in Equation (1-1), $10 \log_{10}(2^\mu \cdot M_{RB,b,f,c}^{PUSCH} n_c(i))$ represents the compensation power determined according to the number of RBs occupied by the user terminal. $M_{RB,b,f,c}^{PUSCH}(i)$ represents a bandwidth of PUSCH resource allocation, which is expressed as the number of resource blocks for PUSCH transmission occasion i on UL BWP b of the carrier f of the serving cell c. In addition, μ represents a subcarrier interval configuration.

In addition, in Equation (1-1), $\alpha_{b,f,c}(j) \cdot PL_{b,f,c}(q_d)$ represents the path loss compensation power. $PL_{b,f,c}(q_d)$ may be a downlink path loss estimate in dB calculated by the user terminal by using the reference signal index $q_d$ for DL BWP. For example, the user terminal may determine $PL_{b,f,c}(q_d)$ by using a difference between the reference signal power and the high layer filtering RSRP.

According to one example of the present disclosure, when the value of j is different, the control unit 320 may determine a value of $\alpha_{b,f,c}(j)$ by using different high layer parameters. For example, when j #0, the user terminal may determine the value of $\alpha_{b,f,c}(j)$ by using the first high layer parameter. For example, when j=0, the user terminal may determine the value of $\alpha_{b,f,c}(j)$ by using a second high layer parameter. The second high layer parameter may be the high layer parameter msg3-Alpha.

In addition, in Equation (1-1), $\Delta_{TF,b,f,c}(i)$ represents the MCS-based compensation power at PUSCH transmission occasion i. According to one example of the present disclosure, the user terminal may determine a value of $\Delta_{TF,b,f,c}(i)$ by using a third high layer parameter. For example, the third high layer parameter may be the high layer parameter deltaMCS for each UL BWP b of each carrier f of the serving cell c.

In addition, in Equation (1-1), $f_{b,f,c}(i, 1)$ represents the compensation power for power control adjustment of uplink channels at PUSCH transmission occasion i. The compensation power for power control adjustment of uplink channels at PUSCH transmission occasion i may include a compensation power for power control adjustment of uplink channels at a transmission occasion prior to PUSCH transmission occasion i (for example, the last transmission occasion $i_{last}$ of PUSCH transmission occasion i) and a correction value. For example, $f_{b,f,c}(i, 1)$ may be determined by the above Equation (1-2).

In addition, in Equation (1-1), the basic power and the adjustment value for the basic power are expressed as two separate components, but the present disclosure is not limited thereto. According to another example of the present disclosure, the adjustment value for the basic power may be considered as a component of the basic power. In this case, Equation (1-1) may be rewritten as the above Equation (1-3), where $P_{O\_PUSCH,b,f,c}(j, m)$ may be composed of the component $P_{O\_NOMINAL\_PUSCH,f,c}(j)$, the component $P_{O\_UE\_PUSCH,b,f,c}(j)$ and the component $P_{O\_UENOMA\_PUSCH,b,f,c}(j, m)$.

The foregoing describes the example of determining the transmission power of the user terminal according to the basic power, the adjustment value for the basic power, the path loss compensation power, the MCS-based compensation power, and the compensation power for power control adjustment of uplink channels. According to another example of the present disclosure, the user terminal may also determine the transmission power of the user terminal according to the basic power, the path loss compensation power, the adjustment value for the path loss compensation power, the MCS-based compensation power, and the compensation power for power control adjustment of uplink channels. For example, PUSCH transmission power of the user terminal on UL BWP of a carrier of a serving cell may be determined by the above Equation (2-1).

Since details of Equation (2-1) are partially the same as the details of Equation (1-1) described above, a detailed description of the same content is omitted herein for simplicity.

In Equation (2-1), $\alpha_{b,f,c}(m) \cdot PL_{b,f,c}(q_d)$ represents the adjustment value for the path loss compensation power. In the present disclosure, $\alpha_{b,f,c}(m)$ may be determined according to the signature information m received in step S101. $\alpha_{b,f,c}(m)$ may be the adjustment value for the path loss compensation parameter. According to one example of the present disclosure, a corresponding relationship between the signature information and the adjustment value for the path loss compensation parameter may be configured. Accordingly, the user terminal may determine $\alpha_{b,f,c}(m)$ according to the corresponding relationship between m and $\alpha_{b,f,c}(m)$. For example, when m=0, $\alpha_{b,f,c}(m)=\alpha_1$; when m=1, $\alpha_{b,f,c}(m)=\alpha_2$; when m=2, $\alpha_{b,f,c}(m)=\alpha_3$, and so on.

In addition, in Equation (2-1), the path loss compensation power and the adjustment value for the path loss compensation power are expressed as two separate components, but the present disclosure is not limited thereto. According to another example of the present disclosure, the adjustment value for the path loss compensation power may be considered as a component of the path loss compensation power. In this case, Equation (2-1) may be rewritten as the above Equation (2-2).

According to one example of the present disclosure, a corresponding relationship between the signature information and the adjusted path loss compensation parameter may be configured. Accordingly, the user terminal may determine $\alpha_{b,f,c}(j,m)$ according to the corresponding relationship between m and $\alpha_{b,f,c}(j,m)$. For example, in a system that symbol level spreading is configured, when m=0, $\alpha_{b,f,c}(j,m)=1$.

In addition, according to another example of the present disclosure, the user terminal may also determine the transmission power of the user terminal according to the basic power, the path loss compensation power, the MCS-based compensation power, the adjustment value for the MCS-based compensation power, and the compensation power for power control adjustment of uplink channels. For example, PUSCH transmission power of the user terminal on UL BWP of a carrier of a serving cell may be determined by the above Equation (3-1):

Since details of Equation (3-1) are partially the same as the details of Equation (1-1) described above, a detailed description of the same content is omitted herein for simplicity.

In Equation (3-1), $\Delta_{NOMA,b,f,c}(i,m)$ represents the adjustment value for the MCS-based compensation power. In the present disclosure, $\Delta_{NOMA,b,f,c}(i, m)$ may be determined according to the signature information m received in step S101. According to one example of the present disclosure, a corresponding relationship between the signature information and the adjustment value for the MCS-based compensation power may be configured. Accordingly, the user terminal may determine $\Delta_{NOMA,b,f,c}(i, m)$ according to the corresponding relationship between m and $\Delta_{NOMA,b,f,c}(i, m)$.

For example, when m=0, $\Delta_{NOMA,b,f,c}(i, m)=\Delta_1$; when m=1, $\Delta_{NOMA,b,f,c}(i, m)=\Delta_2$; when m=2, $\Delta_{NOMA,b,f,c}(i, m)=\Delta_3$, and so on.

In addition, in Equation (3-1), the MCS-based compensation power and the adjustment value for the MCS-based compensation power are expressed as two separate components, but the present disclosure is not limited thereto. According to another example of the present disclosure, the adjustment value for the MCS-based compensation power may be considered as a component of the MCS-based compensation power. In this case, Equation (3-1) may be rewritten as the above Equation (3-2), where $\Delta_{TF,b,f,c}(i,m)$ may be composed of the component $\Delta_{TF,b,f,c}(i)$ and the component $\Delta_{NOMA,b,f,c}(i, m)$.

According to one example of the present disclosure, may also be composed of only the component $\Delta_{NOMA,b,f,c}(i, m)$. For example, in a system that symbol level spreading is configured, $\Delta_{TF,b,f,c}(i, m)$ may be equal to $\Delta_{NOMA,b,f,c}(i, m)$.

According to another example of the present disclosure, a corresponding relationship between the signature information m and $\Delta_{TF,b,f,c}(i, m)$ may be configured. Accordingly, the user terminal may determine the value of $\Delta_{TF,b,f,c}(i, m)$ according to the corresponding relationship between m and $\Delta_{TF,b,f,c}(i, m)$. For example, when m=0, $\Delta_{TF,b,f,c}(i, m)=0$; when m=1, $\Delta_{TF,b,f,c}(i,m)=3$; when m=2, $\Delta_{TF,b,f,c}(i,m)=-3$, and so on.

In addition, according to another example of the present disclosure, the user terminal may also determine the transmission power of the user terminal according to the basic power, the path loss compensation power, the MCS-based compensation power, the compensation power for power control adjustment of uplink channels, and the adjustment value for the compensation power for power control adjustment of uplink channels. For example, PUSCH transmission power of the user terminal on UL BWP of a carrier of a serving cell may be determined by the above Equation (4-1).

Since details of Equation (4-1) are partially the same as the details of Equation (1-1) described above, a detailed description of the same content is omitted herein for simplicity.

In Equation (4-1), $f_{NOMA,b,f,c}(i, l, m)$ represents the adjustment value for the compensation power for power control adjustment of uplink channels. In the present disclosure, $f_{NOMA,b,f,c}(i, l, m)$ may be determined according to the signature information m received in step S101. According to one example of the present disclosure, a corresponding relationship between the signature information and the adjustment value for the compensation power for power control adjustment of uplink channels may be configured. Accordingly, the user terminal may determine $f_{NOMA,b,f,c}(i, l, m)$ according to the corresponding relationship between m and $f_{NOMA,b,f,c}(i, l, m)$. For example, when m=0, $f_{NOMA,b,f,c}(i, l, m)=f_1$; when m=1, $f_{NOMA,b,f,c}(i, l, m)=f_2$; when m=3, $f_{NOMA,b,f,c}(i, l, m)=f_3$, and so on.

In addition, in Equation (4-1), the compensation power for power control adjustment of uplink channels and the adjustment value for the compensation power for power control adjustment of uplink channels are expressed as two separate components, but the present disclosure is not limited thereto. According to another example of the present disclosure, the adjustment value for the compensation power for power control adjustment of uplink channels may be considered as a component of the compensation power for power control adjustment of uplink channels. In this case, Equation (4-1) may be rewritten as the above Equation (4-2), where $f_{b,f,c}(i, l, m)$ represents the adjusted compensation power for power control adjustment of uplink channels.

When the compensation power for power control adjustment of uplink channels is adjusted, the correction value may be adjusted accordingly.

According to one example of the present disclosure, the correction value may be referred to as a TPC command, which may be included in DCI format 0_0 or DCI format 0_1 for scheduling PUSCH transmission occasion ion UL BWP b of the carrier f of the serving cell c. In addition, the correction value may also be coded jointly with other TPC commands in DCI format 2_2.

For example, a corresponding relationship between the value of the TPC command field and the correction value may be configured, as shown in the above Table 1. For example, in Table 1, the first column represents the value of the TPC command field, the second column represents the accumulated $\delta_{PUSCH,b,f,c}$, and the third column represents the absolute $\delta_{PUSCH,b,f,c}$.

It should be noted that, although the equations for determining the transmission power of the user terminal (for example, Equations (1-1)-(4-2) as described above) only involve an adjustment value for one of the basic power, the path loss compensation power, the compensation power based on the coding and modulation scheme, and the compensation power for power control adjustment of uplink channels, those skilled in the art would appreciate that the equations for determining the transmission power of the user terminal may involve adjustment values for two or more of the basic power, the path loss compensation power, the compensation power based on the coding and modulation scheme, and the compensation power for power control adjustment of uplink channels.

In addition, according to one example of the present disclosure, the control unit 320 may set a plurality of power update times to update the transmission power of PUSCH. For example, the control unit 320 may update the transmission power of PUSCH at a start time and a middle time of PUSCH transmission.

In addition, according to another example of the present disclosure, the signature information m as described above may be any one of the index j configured by the parameter setting, the reference signal index qd used by the user terminal when calculating the downlink path loss, and the index/of the PUSCH power control adjustment state. For example, the value of the signature information m may be the same as the value of the index j configured by the parameter setting, the reference signal index qd used by the user terminal when calculating the downlink path loss, or the index/of the PUSCH power control adjustment state.

In addition, according to one example of the present disclosure, user terminals with the same transmission power in the communication system may be divided into a group of user terminals. A plurality of user terminals in the same group of user terminals may have signatures that are at least partially the same. For example, a plurality of user terminals in the same group of user terminals may have the same transmission power, and at the same time may have different spreading manners, interleaving manners, scrambling manners and the like.

With the user terminal in this embodiment, the signature information of the user terminal has a direct relationship with power control of the user terminal. Therefore, when power control is performed on a plurality of user terminals, the communication system may consider signature information of the plurality of user terminals, to reduce interference between the plurality of user terminals, so as to enable a better performance of the communication system. In addition, with the user terminal in this embodiment, a range of existing power control parameters is extended, so that they can be adapted to the NOMA system.

Figure 4:
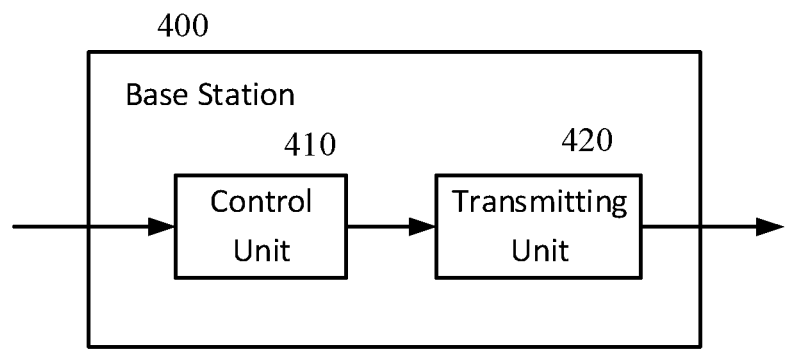
FIG. 4 is a schematic structural diagram of a base station according to an embodiment of the present disclosure.

A base station according to an embodiment of the present disclosure will be described below with reference to FIG. 4. FIG. 4 is a schematic structural diagram of a base station 400 according to an embodiment of the present disclosure. Since functions of the base station 400 are partially the same as the details of the method described above with reference to FIG. 2, a detailed description of the same content is omitted herein for simplicity. As shown in FIG. 4, the base station 400 includes: a control unit 410 configured to determine signature information for a user terminal, where the signature information includes power information, and the power information indicates information about transmission power of the user terminal; and a transmitting unit 420 configured to transmit the determined signature information to the user terminal. In addition to these two units, the base station 400 may further include other components. However, since these components are irrelevant with the content of the embodiments of the present disclosure, their illustrations and descriptions are omitted herein.

According to one example of the present disclosure, the signature information may be a signature parameter. The user terminal may determine the signature of the user terminal according to the signature parameter.

For example, the signature information may include power information, which indicates information about a transmission power of the user terminal, so that the user terminal may determine its own transmission power. In addition, the signature information may further include other information. For example, the signature information may further include interleaving information indicating the interleaving manner of the user terminal, so that the user terminal may determine its own interleaving manner. The signature information may further include scrambling information indicating the scrambling manner of the user terminal, so that the user terminal may determine its own scrambling manner. The signature information may further include spreading information indicating the spreading manner of the user terminal, so that the user terminal may determine its own spreading manner. Certainly, the signature information is not limited to include the power information, the interleaving information, the scrambling information, and the spreading information as listed herein, and may further include information indicating other operations performed on data when the user terminal transmits the data.

According to another example of the present disclosure, the transmitting unit 420 may transmit the signature information by Radio Resource Control (RRC) signaling, Downlink Control Information (DCI), Media Access Control (MAC) Control Elements (CEs) and the like. For example, the transmitting unit 420 may transmit the signature information by using a plurality of DCI formats, such as DCI format 0_0 or DCI format 0_1 for PUSCH scheduling, DCI format 2_2 for PDSCH scheduling, and so on.

With the base station in this embodiment, the signature information of the user terminal has a direct relationship with power control of the user terminal. Therefore, when power control is performed on a plurality of user terminals, the communication system may consider signature information of the plurality of user terminals, to reduce interference between the plurality of user terminals, so as to enable a better performance of the communication system. In addition, with the base station in this embodiment, a range of existing power control parameters is extended, so that they can be adapted to the NOMA system.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. via wire and/or wireless), and the respective functional blocks may be implemented by these apparatuses.

Figure 5:
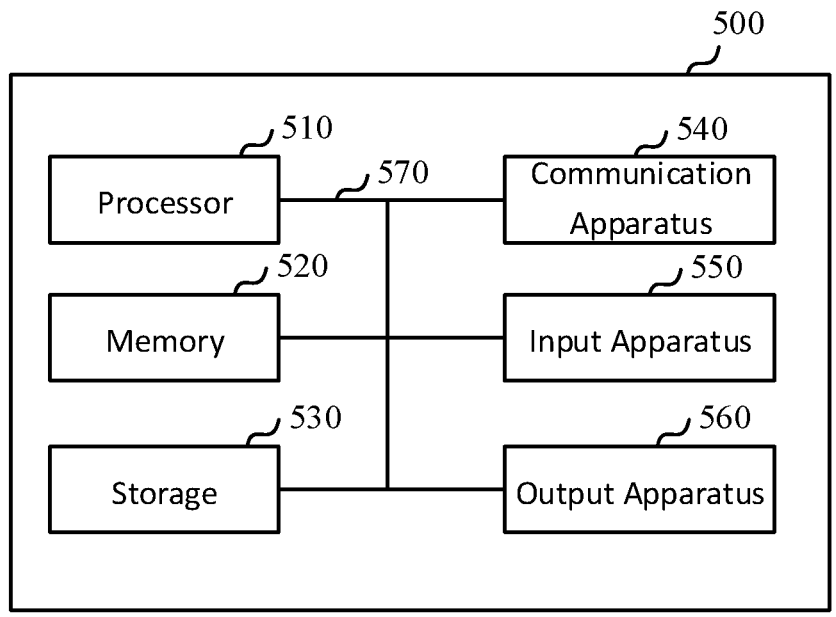
FIG. 5 is a schematic diagram of a hardware structure of a user terminal or a base station involved according to an embodiment of the present disclosure.

For example, the device (for example, the base station or the user terminal and the like) in one embodiment of the present disclosure may function as a computer that executes the processes of the wireless communication method of the present disclosure. FIG. 5 is a schematic diagram of a hardware structure of a device 500 (a base station or a user terminal) involved in an embodiment of the present disclosure. The device 500 (the base station or the user terminal) described above may be constituted as a computer apparatus that physically comprises a processor 510, a memory 520, a storage 530, a communication apparatus 540, an input apparatus 550, an output apparatus 560, a bus 570 and the like.

In addition, in the following description, terms such as "apparatus" may be replaced with circuits, devices, units, and the like. The hardware structure of the wireless base station 10 and the user terminal 20 may include one or more of the respective apparatuses shown in the figure, or may not include a part of the apparatuses.

For example, only one processor 510 is illustrated, but there may be a plurality of processors. Furthermore, processes may be performed by one processor, or processes may be performed by more than one processor simultaneously, sequentially, or by other methods. In addition, the processor 510 may be installed by more than one chip.

Respective functions of the device 500 may be implemented, for example, by reading specified software (program) onto hardware such as the processor 510 and the memory 520, so that the processor 510 performs computations, controls communication performed by the communication apparatus 540, and controls reading and/or writing of data in the memory 520 and the storage 530.

The processor 510, for example, operates an operating system to control the entire computer. The processor 510 may be constituted by a Central Processing Unit (CPU), which includes interfaces with peripheral apparatuses, a control apparatus, a computing apparatus, a register and the like. For example, the control unit, the receiving unit and the like described above may be implemented by the processor 510.

In addition, the processor 510 reads programs (program codes), software modules and data from the storage 530 and/or the communication apparatus 540 to the memory 520, and execute various processes according to them. As for the program, a program causing computers to execute at least a part of the operations described in the above embodiments may be employed. For example, the control unit of the user terminal 300 may be implemented by a control program stored in the memory 520 and operated by the processor 510, and other functional blocks may also be implemented similarly.

The memory 520 is a computer-readable recording medium, and may be constituted, for example, by at least one of a Read Only Memory (ROM), an Erasable Programmable ROM (EPROM), an Electrically EPROM (EE- PROM), a Random Access Memory (RAM) and other appropriate storage media. The memory 520 may also be referred to as a register, a cache, a main memory (a main storage apparatus) and the like. The memory 520 may store executable programs (program codes), software modules and the like for implementing the method involved in one embodiment of the present disclosure.

The storage 530 is a computer-readable recording medium, and may be constituted, for example, by at least one of a flexible disk, a floppy 8 disk, a magneto-optical disk (e.g., a Compact Disc ROM (CD-ROM) and the like), a digital versatile disk, a Blu-ray 8 disk, a removable disk, a hard driver, a smart card, a flash memory device (e.g., a card, a stick and a key driver), a magnetic stripe, a database, a server, and other appropriate storage media. The storage 530 may also be referred to as an auxiliary storage apparatus.

The communication apparatus 540 is a hardware (transceiver device) performing communication between computers via a wired and/or wireless network, and is also referred to as a network device, a network controller, a network card, a communication module and the like, for example. The communication apparatus 540 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 540.

The input apparatus 550 is an input device (e.g., a keyboard, a mouse, a microphone, a switch, a button, a sensor and the like) that receives input from the outside. The output apparatus 560 is an output device (e.g., a display, a speaker, a Light Emitting Diode (LED) light and the like) that performs outputting to the outside. In addition, the input apparatus 550 and the output apparatus 560 may also be an integrated structure (e.g., a touch screen).

Furthermore, the respective apparatuses such as the processor 510 and the memory 520 are connected by the bus 570 that communicates information. The bus 570 may be constituted by a single bus or by different buses between the apparatuses.

Furthermore, the base station and the user terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 510 may be installed by at least one of the hardware.

(Variations)

In addition, the terms illustrated in the present specification and/or the terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a "pilot", a "pilot signal" and so on, depending on the standard applied. Furthermore, a component carrier (CC) may also be referred to as a cell, a frequency carrier, a carrier frequency, and the like.

Furthermore, the information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

The names used for the parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

The information, signals and the like described in this specification may be represented by using any one of various different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

The information, signals and the like that are input or output may be stored in a specific location (for example, in a memory), or may be managed in a control table. The information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, downlink control information (DCI), uplink control information (UCI)), higher layer signaling (for example, RRC (Radio Resource Control) signaling, broadcast information (master information blocks (MIBs), system information blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as "RRC messages", for example, RRC connection setup messages, RRC connection reconfiguration messages, and so on. Furthermore, MAC signaling may be reported by using, for example, MAC control elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. The base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), respective manners/embodiments of the present disclosure may also be applied. At this time, functions provided by the above base station may be regarded as functions provided by the user terminal. Furthermore, the words "uplink" and "downlink" may also be replaced with "side". For example, an uplink channel may be replaced with a side channel Also, the user terminal in this specification may be replaced with a wireless base station. At this time, functions provided by the above user terminal may be regarded as functions provided by the base station.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched and used during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (New Radio Access Technology), NR (New Radio), NX (New radio access), FX (Future generation radio access), GSM8 (Global System for Mobile communications), CDMA (Code Division Multiple Access) 3000, UMB (Ultra Mobile Broadband), IEEE 920.11 (Wi-Fi8), IEEE 920.16 (WiMAXB), IEEE 920.20, UWB (Ultra-Wide Band), Bluetooth 8 and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is to say, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described in detail above, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

What is claimed is:

1. A terminal, comprising:
a receiving unit configured to receive signature information for the terminal from a base station; and
a control unit configured to determine a transmission power of the terminal according to the received signature information,
wherein, the signature information includes power information indicating information about the transmission power of the terminal, the power information indicates adjustment information for at least one of a path loss compensation power, a compensation power based on the modulation and coding scheme, and a compensation power for power control adjustment of uplink channels.

2. The terminal of claim 1, wherein
the control unit is further configured to determine the transmission power of the terminal according to a basic power of the terminal, the path loss compensation power of the terminal, the compensation power based on a modulation and coding scheme of the terminal, and the compensation power for power control adjustment of uplink channels of the terminal.

3. The terminal of claim 2, wherein
the basic power includes a nominal power set by the base station for all terminals within a cell coverage of the base station, and a dedicated power for the terminal;
the power information indicates adjustment information for the dedicated power of the terminal.

4. The terminal of claim 2, wherein
the path loss compensation power is determined according to a path loss compensation parameter of the terminal and a downlink path loss of the terminal;
the power information indicates adjustment information for the path loss compensation parameter of the terminal.

5. The terminal of claim 2, wherein the control unit is further configured to determine the adjustment information for at least one of the basic power, the path loss compensation power, the compensation power based on the modulation and coding scheme, and the compensation power for power control adjustment of uplink channels according to high layer parameters.

6. A base station, comprising:
a control unit configured to determine signature information for a terminal; and
a transmitting unit configured to transmit the determined signature information to the terminal,
wherein, the signature information includes power information indicating information about a transmission power of the terminal, the power information indicates adjustment information for at least one of a path loss compensation power, a compensation power based on the modulation and coding scheme, and a compensation power for power control adjustment of uplink channels.

7. A method performed by a terminal, the method comprising:
receiving signature information for the terminal from a base station; and
determining a transmission power of the terminal according to the received signature information,
wherein, the signature information includes power information indicating information about the transmission power of the terminal, the power information indicates adjustment information for at least one of a path loss compensation power, a compensation power based on the modulation and coding scheme, and a compensation power for power control adjustment of uplink channels.

8. The method of claim 7 further comprising:
determining the transmission power of the terminal according to a basic power of the terminal, the path loss compensation power of the terminal, the compensation power based on a modulation and coding scheme of the terminal, and the compensation power for power control adjustment of uplink channels of the terminal.

9. The method of claim 8, wherein
the basic power includes a nominal power set by the base station for all terminals within a cell coverage of the base station, and a dedicated power for the terminal;
the power information indicates adjustment information for the dedicated power of the terminal.

10. The method of claim 8, wherein
the path loss compensation power is determined according to a path loss compensation parameter of the terminal and a downlink path loss of the terminal;
the power information indicates adjustment information for the path loss compensation parameter of the terminal.

11. The method of claim 8 further comprising:
determining the adjustment information for at least one of the basic power, the path loss compensation power, the compensation power based on the modulation and coding scheme, and the compensation power for power control adjustment of uplink channels according to high layer parameters.

\* \* \* \* \*